United States Patent [19]

Johnson

[11] Patent Number: 5,362,319

[45] Date of Patent: * Nov. 8, 1994

[54] PROCESS FOR TREATING FLY ASH AND BOTTOM ASH AND THE RESULTING PRODUCT

[76] Inventor: William B. Johnson, 209 Mississipi Dr., Monticello, Minn. 55362

[*] Notice: The portion of the term of this patent subsequent to Sep. 13, 2011 has been disclaimed.

[21] Appl. No.: 137,730

[22] Filed: Oct. 21, 1993

Related U.S. Application Data

[63] Continuation-in-part of Ser. No. 967,490, Oct. 23, 1992.

[51] Int. Cl.$^5$ ............................ C04B 7/12; C04B 7/24; C04B 7/13
[52] U.S. Cl. ................................... 106/705; 106/697; 106/707; 106/708; 106/709; 106/710; 106/DIG. 1; 588/252; 588/256; 588/257; 264/333
[58] Field of Search ................... 106/705, 706, , 707, 106/708, DIG. 1, 697, 709, 710; 588/252, 256, 257; 264/233

[56] References Cited

U.S. PATENT DOCUMENTS

| | | | |
|---|---|---|---|
| 3,188,751 | 6/1965 | Sutton | 34/12 |
| 3,962,080 | 6/1976 | Dulin et al. | 106/DIG. 1 |
| 4,157,696 | 6/1979 | Carlberg | 119/172 |
| 4,354,876 | 10/1982 | Webster | 106/708 |
| 4,586,958 | 5/1986 | Matsuura et al. | 106/708 |
| 4,874,153 | 10/1989 | Hashimoto et al. | 264/63 |
| 5,092,930 | 3/1992 | Fijisawa et al. | 106/708 |
| 5,092,931 | 3/1992 | Fujisawa et al. | 106/708 |

FOREIGN PATENT DOCUMENTS

| | | | |
|---|---|---|---|
| 430232 | 6/1991 | European Pat. Off. | |
| 51-015532 | 5/1976 | Japan . | |
| 61-072667 | 4/1986 | Japan | 106/708 |
| 61-072668 | 4/1986 | Japan | 106/708 |
| 61-072670 | 4/1986 | Japan | 106/708 |
| 02267149 | 10/1990 | Japan . | |
| 02283678 | 11/1990 | Japan . | |
| 03016949 | 1/1991 | Japan . | |
| 119854 | 12/1983 | U.S.S.R. . | |

OTHER PUBLICATIONS

Journal Article: Tokyo Kogyo Shikensho Kokoku (Tkshai), vol. 63(1), pp. 1-50, 1968.

*Primary Examiner*—Anthony Green
*Attorney, Agent, or Firm*—James V. Harmon

[57] ABSTRACT

The invention provides a novel, environmentally stabilized formed product and to a method of producing a hard, dry, e.g., agglomerated or formed, environmentally stabilized product useful as a construction material, e.g., as pellets, panels, bricks, etc. comprising: a) ash such as RDF or coal ash (typically stack scrubber solids or bottom ash obtained from the burning of coal), b) an oxidizer and c) water. The amount of water present is selected to render the product plastic so that it can be molded to the desired shape. The oxidizer is provided in a sufficient amount to oxidize unstable compounds and to convert potassium, calcium or magnesium bisulfite to the sulfate form. Following the addition of the oxidizer, the admixture is exposed to electromagnetic energy, preferably ultraviolet light, to help drive the oxidation reaction to completion. In an optional form of the invention, portland cement, plaster of paris or a minor amount of a cation exchange resin or Zeolite clay is added to the mixture to sequester heavy metals. The admixture is formed or molded into pieces or bodies of the desired shape, such as blocks, slabs, pellets or agglomerates. The resulting pieces harden to form an environmentally stable product at room temperature so that oven baking of the end product is not required.

23 Claims, No Drawings

PROCESS FOR TREATING FLY ASH AND BOTTOM ASH AND THE RESULTING PRODUCT

This application is a continuation-in-part of prior application Ser. No. 07/967,490 filed Oct. 23, 1992 pending.

FIELD OF THE INVENTION

This invention relates to environmental stabilization of products formed from waste, primarily refuse derived fuel (RDF) or coal ash, e.g., fly ash and bottom ash, and to a method of forming and stabilizing such products.

BACKGROUND OF THE INVENTION

Several processes have been developed for producing aggregate from fly ash. For example, Japanese patent 76015532-B describes the production of a lightweight aggregate from papermaking sludge and fly ash, kraft pulp, lime sludge, waste clay or earth. However, the resulting product had to be calcined at about 1100° C., increasing energy requirements and costs. An article in Tokyo Kogyo Shikensho Hokoku (TKSHAI), Volume 63(1), pages 1–50, 1968, also describes aggregate formed from fly ash and paper-pulp waste. In this case, pulp waste liquor, i.e., liquid waste, was mixed with the fly ash.

European patent EP 430 232-A (priority U.5. SN 443,156) describes ceramic prepared by forming a suspension of clay and water, adding ash and organic matter and dewatering to below 60% by weight, shaping the particles and firing at elevated temperature. The ash, however, is obtained from sewage sludge or paper containing 10% clay and the organic matter is papermill waste or sewage sludge.

Japanese patent 02283678-A describes the production of ceramic products by mixing or kneading silica fines with industrial waste, such as sewage sludge (ash), sludge from water treatment plants, crude refuse incinerated ash, crushed waste soil, fly ash, paper sludge, pulp waste liquid, and sediment from the sea or rivers. The product is molded and fired at an elevated temperature.

These prior products have certain shortcomings. First, the energy requirements are substantial due to the requirement for firing the aggregate in an oven. On the other hand, if high temperatures are not used for calcining the product, organic matter will render the aggregate biologically unstable. For example, unless aggregates containing papermill waste with a significant organic content are calcined at a high temperature to destroy the organic compounds, the resulting product is biologically unstable. Organic breakdown products that are present create bad odors and can otherwise contaminate the environment by leaching from the product and can also cause inferior strength. One objective is to eliminate these problems without the need for oven drying.

Prior products have been "fused" as by being calcined in an oven. Consequently, they do not contain fiber, the fiber having been converted to ash in the oven. This removes any cohesive strength that could otherwise have been imparted to the product by retained fiber.

Finally, aggregates previously manufactured are not regarded to be environmentally stable with respect to the presence of heavy metals which can also leach from the product into the environment. The heavy metals that are primarily of concern in products of this kind are lead, mercury, chromium, strontium and cadmium. The need to prevent heavy metals from entering the environment is becoming increasingly important.

In view of these and other shortcomings of the prior art, it is a primary object of the invention to provide a substantially environmentally stable product from ash, especially coal ash either with or without the addition of papermill waste such as papermill sludge containing, for example, a mixture of paper fibers, clay and calcium carbonate.

Another object of the invention is to provide a biologically stable product from waste containing fly ash or bottom ash which can be dried at room temperature (e.g., about 50° F.–90° F.) rather than oven drying or calcining, thereby reducing energy requirements and yet producing an end product that will not contaminate the environment or emit bad odors.

Still another object is to provide an agglomerate or aggregate that can be used as a construction material and is lighter in weight than the standard aggregate commonly employed in concrete.

These and other more detailed and specific objects of the invention will be apparent in view of the following specification which illustrates by way of example but a few of the various forms of the present invention that will be apparent to those skilled in the art within the scope of the appended claims.

SUMMARY OF THE INVENTION

This invention provides a method of environmentally stabilizing waste to produce a hard, dry, environmentally stable, formed, e.g., aggregated, product useful as building material from an admixture of ash such as coal ash, e.g., fly ash, stack scrubber solids or bottom ash and an oxidizing agent. Optionally, papermill waste, e.g., papermill sludge is mixed with the ash. A minor amount of water is provided or maintained in the admixture to give it a plastic consistency that enables it to be formed or molded into pieces such as pellets.

In the chemical digestion of paper pulp which is one form of papermill waste that can, if desired, be used herein as an optional raw material, calcium sulfite, sodium sulfite, potassium sulfite or magnesium sulfite is usually present. In a preferred form of the invention, an oxidizer is added to the composition in a sufficient amount to oxidize unstable compounds and convert sulfite ions, when present, to the sulfate form. Following the addition of the oxidizer, the admixture is preferably exposed to electromagnetic energy, preferably ultraviolet light, to help drive the oxidation reaction just described to completion.

In an optional form of the invention, a minor amount, e.g., usually about 0.01% to about 1.0% of an ion exchange resin or Zeolite clay is also added to the mixture for the purpose of sequestering heavy metals.

The water that is provided by addition or that is already present in the paper sludge (when used) renders the admixture plastic, i.e., a deformable mass which can be formed into pieces or bodies of the desired shape, such as blocks, slabs, pellets or agglomerates typically about one-fourth inch to about one-half inch in diameter.

The present invention provides a new agglomerated, environmentally stable product in the form of a molded, unfused body, pellet or agglomerate that comprises coal ash together with an oxidizer. When papermill waste is used, the unfused agglomerated product contains about 3–7 parts ash such as coal ash, and optionally about 7–3 parts papermill sludge containing retained fiber to make a total of 10 parts. When papermill waste is used in the composition, the retained wood fiber imparts cohesive strength to the product. In this way, the invention makes full use of the ability of the retained fiber to unify the product and improve its strength even though it is not fused by heating it in an oven. Instead, the resulting bodies, pellets or pieces, e.g., agglomerates, are allowed to dry and harden at room temperature. The agglomerates are substantially dust free, hard, dry, environmentally stable and give off little or no objectionable odor. They are clean and when placed in water will not release significant quantities of heavy metals. The aggregate bodies have satisfactory strength for a variety of uses, e.g., for producing a concrete product with a compression strength that is typically about 1900 psi (ASTM Test #39–86).

An important advantage of the invention is that it facilitates a pozzolanic reaction during the drying step akin to the setting of portland cement, i.e., it is characterized by an irreversible chemical combination of inorganic constituents which produces a hardening of the rock-like final product to improve its strength and reduce the solubility of its constituents.

In the form of the invention in which fiber is employed, the following constituents are mixed together in the first stage of the process: a) about 7–3 parts ash such as coal ash (e.g., stack scrubber solids obtained from the burning of coal) or refuse derived fuel (RDF) ash, b) a minor amount of an oxidizer and, optionally, c) about 3–7 parts papermill sludge which typically is made up of about 25% clay, 25% calcium carbonate and 50% wood fiber (dry basis) to make a total of 10 parts. Typically, about 0.5–2 parts water are maintained in the composition. The water, however, is provided or maintained only in an amount sufficient to render the product plastic so that it can be formed, shaped or molded to the desired shape.

All quantities herein are expressed as parts or percent by weight. Percentages and ratios of the admixture will be expressed on a wet basis, i.e., including water.

DETAILED DESCRIPTION OF THE INVENTION

Sources of Waste Material

The primary waste material is ash, such as that obtained from burning coal, especially the fly ash or bottom ash obtained from a coal burning plant or refuse derived fuel (RDF) ash, i.e., ash from burning collected trash. The term "ash" herein is intended to include RDF ash as well as coal ash. One fly ash sample from burning Western coal had the following analysis: 45% silica ($SiO_2$), 28% alumina ($Al_2O_3$), 5% lime (CaO), 3% ferric oxide ($Fe_2O_3$), 1.4% titania ($TiO_2$) with the balance made up of other trace minerals. Since other ash materials are also useful in the invention, there is no intention to limit the composition to the foregoing analysis which is presented merely by way of example. The fly ash is a dry, dark-colored hygroscopic powder that may contain trace amounts of heavy metals of which Pb, Hg, Cr, Sr and Cd are the most troublesome. The fly ash also contains a minor amount of moisture, e.g., less than about 1.0%. Optionally, the fly ash can be collected in a stack gas scrubber in which ground limestone and/or quick lime (CaO) is added to the gas. When dissolved in water, CaO is present as calcium hydroxide [$Ca(OH)_2$]. The amount of CaO added is about 0.1 pounds per pound of stack gas solids.

A second optional waste product that can be added, if desired, is papermill waste such as sludge from a sulfite papermill or from a ground-wood mill. One typical papermill waste from a sulfite mill contains about 2 parts paper fiber, about 1 part clay, and about 1 part calcium carbonate (dry basis). The sludge also contains about 10% moisture and a minor amount, e.g., about 1%–3% by weight sodium bisulfite, calcium bisulfite, potassium bisulfite or magnesium bisulfite. One typical sulfite papermill sludge contained 1% potassium bisulfite When stack gas scrubber solids are used, the formed end product is an unfused agglomerate which comprises a) an ash comprising stack gas scrubber solids and b) calcium carbonate and a minor amount of a salt of one of the following: calcium, potassium, sodium, or magnesium.

Optionally, a metal-binding composition or heavy metal sequestering agent such as an ion exchange resin, e.g., a cation exchange resin or Zeolite clay is also added. In this case the formed product contains a cation exchange resin.

One example is a cation exchange resin known as Zeo-Rex® from the Permutit Company of Paramus, N.J. While the amount of ion exchange resin used will vary depending upon the heavy metal contaminants and the quantity of metal present, it is typically used in an amount from about 0.01% to about 1.0%. The ion exchange resin becomes more efficient as the atomic number and valent state of cations present increases. Thus, less is required with ions of higher atomic number. It should be noted that the oxidizer helps raise the metal ions to their highest valence state, assuring efficient action of the ion exchange resin.

The waste product or products are uniformly mixed together with a minor amount of an oxidizing agent. A variety of oxidizing agents can be employed. Examples are perborate oxidizers such as sodium perborate ($Na_2BO_4$) in the amount of about 0.1%. Other oxidizers can also be used, such as sodium hypochlorite ($Na_2Cl_2O_7$), calcium hypochlorite ($CACl_2O_7$), sodium percarbonate ($Na_2CO_3.H_2O_2$), calcium percarbonate ($CaCO_3.H_2O_2$), hydrogen peroxide ($H_2O_2$), calcium peroxide, sodium peroxide, ethylene oxide and propylene oxide, among others. Quick lime (CaO) may make up about 5% of the fly ash. The oxidizing agent is preferably used in an amount of about 0.01% to about 10% and typically about 0.05% to about 3.0%. The oxidizer when used with the lime that has already been added to the fly ash will raise the pH, typically from an original pH of about 5.0 to a pH with oxidizer and lime present of about 9.5. When lime is contained in the ash used in the present process, it renders the sulfate anions relatively insoluble. If the fly ash that is being used is modified by the addition of lime to the stack gases, about 0.3 pounds of crushed limestone and about 0.1 pounds of lime (CaO) are usually mixed with about 1.0 pounds of fly ash in the stack gases. The present invention can be used with ordinary fly ash or with fly ash that is modified by the addition of lime in this manner.

Mixing of Waste Products, Oxidizer and Sequestering Agent

Mixing can be accomplished in a variety of ways. One preferred method is to mix the "dry" constituents, e.g., about 2 parts papermill waste (when present) and about 2 parts fly ash with a relatively small quantity of oxidizer and, if desired, with the optional heavy metal sequestering agent by passing them together through a high speed mixer such as a high intensity turbulator mixer which consists of a horizontal cylindrical mixing chamber having a diameter of about 12 inches and a length of 40 inches with a multiple-bladed impeller rotating at 1740 rpm, e.g., a Model 33Tlll turbulator by Ferro-Tech Company of Wyandotte, Mich. Material will pass through the turbulator in about three seconds and emerges as a loose admixture which is fed onto a conveyor as a layer, typically about one inch thick.

This loose, often fluffy layer is then preferably exposed to electromagnetic energy, e.g., ultraviolet radiation, for a sufficient time to facilitate the oxidation reaction. In one application, a layer two inches thick was exposed to six ultraviolet bulbs of 100 watts each for five seconds. The bulbs were placed six inches above the product. In this reaction, the sulfite ion is oxidized to the sulfate ion, forming harmless metal sulfates. Upon exposure to ultraviolet radiation, the sulfite will be converted to sulfate in about five seconds. In this reaction at least 85%, and usually over 95% of the sulfite, e.g., in the calcium salt is converted to sulfate (gypsum). The formed end product is useful as a building material comprising ash and an oxidant that is formed into a hard, unfused, environmentally stable body wherein at least about 85% of sulfur-containing ions present are converted by said oxidant to a sulfate.

Papermill waste also contains organic material, primarily in two forms: papermill waste liquor which contains lignins, saccharides and other compounds, and organic solids, primarily paper fibers. It is primarily the former that are unstable. The oxidizer was found to be particularly effective in stabilizing organic compounds present in the papermill waste. It kills back resident biological populations, it raises the pH, and it binds water to create an environment that is inhospitable to microbial growth. It also oxidizes reactive sites on the organic molecules, rendering them stable.

Following the addition of the oxidizer, the organic papermill waste is surprisingly stable. It exhibits little or no objectionable odor and environmental contaminants are not subject to being leached from the cured aggregate following drying.

As already mentioned, the compositions in accordance with the present invention can be formed from fly ash or bottom ash without added fiber from papermill waste or other sources. If no fiber is used and coal ash is the only source of waste, the amount of oxidizer is usually used in an amount of from about 1% to about 10% with about 3% to 6% being typical. It was discovered that oxidation of the ash that results from the addition of an oxidizer is highly effective in producing an insoluble sulfate salt in crystalline form. This is especially beneficial because the sulfate is relative inactive chemically, i.e., the insoluble sulfate crystal is well adapted to becoming enmeshed and tightly bound in the pozzolanic matrix which develops as the finished product sets up. Thus, the oxidation of the ash is an important factor in the hardening process that takes place in the pozzolanic reaction during the drying or setting step. The setting of the oxidized ash is similar to the setting of portland cement and is characterized by an irreversible chemical combination of inorganic constituents to produce a setting up of the final product to a rock-like composition with excellent strength and reduced solubility of the constituent materials. The oxidizer is used in sufficient quantity to oxidize all reactive fractions in the ash mixture. The oxidizer is added in a series of increments. After each increment, the mixture is sampled and titrated with a permanganate titer. The level at which the titration indicates residual unreacted oxidizer is the recommended use level. (As a practical matter, a substantial excess of oxidizer can be used, economics permitting.)

In one form of the invention, fly ash scrubber solids are mixed with from about 0.5% to about 10%, and typically about 6%, of an oxidizer and an effective amount of water as required to render the composition plastic, i.e., so that it can be formed or molded. After the oxidizer is uniformly mixed with the fly ash and water is added, the product is formed, e.g., by being pelletized, and is preferably set by being exposed to ultraviolet light. In addition, a heavy metal chelating agent can be employed such as Zeolite clay, preferably in an amount of about 1% to 12% with about 8% being typical.

One preferred Zeolite clay that can be employed in the present is a Zeolite clay sold under the product designation Zeobrite 100 by the Zeotech Corporation of Albuquerque, N.M. The Zeolite clay assists in the hardening process, gives body to the composition, and sequesters heavy metals such as lead and mercury, thereby improving the leaching performance of the finished product; i.e., reducing the amount of heavy metals that can be leached from the finished product when exposed to water. In another form of the invention, calcium hydroxide is used together with Zeolite clay and an oxidizer. If desired, additional pozzolanic substances can be employed, most preferably portland cement or plaster of paris in an amount of from about 1% to 10% and typically about 4%. When portland cement is used, it is preferably used with Zeolite clay as well as the oxidizer that is present. The portland cement helps to harden the final product, giving it greater strength and abrasion resistance. The portland cement and Zeolite clay produce a synergistic effect with the oxidizer to improve strength, hardness and leach resistance of the finished product. The finished admixture will then contain portland cement or plaster of paris in an amount sufficient to increase the strength of the product.

In another example of the invention, bottom ash is used in place of fly ash. In this case, about 2% to about 8% of an oxidizer is used together with preferably about 3% to about 10% calcium hydroxide (lime) and sufficient water for molding as described above.

Thus, the invention provides a formed product, typically an aggregate, pellet or agglomerate, but it is also useful for forming other environmentally stable building materials such as dimensional lumber, building board, tile backer, panel, block, or brick useful for any construction application. These products can be mixed, formed and set up as described below but without the addition of fiber. In the preferred forms of the invention, calcium hydroxide, calcium carbonate, portland cement, plaster of paris and like pozzolanic materials add further strength, help to control pH, and reduce the leaching of heavy metals.

Leachate reduction and strength improvements have been accomplished very effectively by converting substantially all $SO_x$ species to $SO_4^=$ anion. This conversion, along with added constituents containing $Ca^{++}$ produces $CaSO_4$ which was found highly effective in enabling the sulfur-containing salts to be tightly bound in the pozzolanic matrix to achieve greater strength and reduced leachate. Thus the $SO_4^=$ anion binds with heavy metal ions to reduce their solubility. The effect is further enhanced by the chelation of any remaining soluble heavy metal ions. The process further takes advantage of the pozzolanic properties of the ash, rendering a hard, stonelike material that is irreversibly solidified. The oxidation reaction can be assisted by the use of ultraviolet light.

The conversion of $SO_x$ species to the relatively insoluble sulfate form is further accelerated by the use of ultraviolet light together with the oxidizer. Ultraviolet light can be provided either from fluorescent lighting, sunlight or preferably ultraviolet lights as described above. A chelating agent is used to bid with heavy metals.

Zeolite clay was found to be highly effective as a chelator for fly ash or bottom ash, particularly when used together with an oxidizer of the type described above. As the chelation agent concentration is increased in a composition, the heavy metal that will be present in the leachate will be reduced. The chelation level needed for a particular waste ash product is determined by measuring leachate's heavy metal content versus incremental additions of chelator. The resulting curve is then plotted and the proper concentration identified. As with the oxidizer, a substantial excess may be used.

Both fly ash scrubber solids and bottom ash are typically moist or wet products. If sufficient water is present, no additional water need be added to render the product plastic, i.e., formable or moldable so that it can be pressed into pieces or otherwise formed. However, if insufficient water is present, an effective amount is added to render the composition plastic. The plastic mass is then molded or otherwise formed. Setting of the resulting pieces of the plastic product is carried out at room temperature and does not require heating, e.g., by baking or sintering the product in an oven.

It was discovered that the presence of $Ca^{++}$ ions provided by the present process together with oxidation is very effective in producing the relatively stable and only slightly soluble calcium sulfate crystal which is an important factor in causing the pozzolanic reaction and also provides a more homogenous mix of sulfur oxide anions. This promotes the formation of a crystalline end product rather than a heterogenous mixture of materials. By contrast in the prior art, for example in accordance with U.S. Pat. No. 3,962,080, a relatively high amount of much more soluble sodium salts are present. The sodium salts produced are undesirable because of their much greater solubility which reduces the strength of the end product and increases the amount of heavy metal in the leachate by occupying chelating sites.

Forming or Molding

Following the exposure of the admixture to ultraviolet radiation, the material which is then in a plastic condition is fabricated or otherwise formed into products such as pellets. Forming or molding can be conveniently accomplished with a pan-type pelletizer such as a disc pelletizer by the Ferro-Tech Company of Wyandotte, Mich., in about one to five minutes. A quantity of water is added at this stage unless an effective amount of water is already present to render the admixture plastic and formable, i.e., moldable. In the pan pelletizer, a small amount, usually about 5% of added water is sprayed onto the admixture to facilitate agglomeration of the particles as the pan rotates at 25 rpm. In one typical product, about 0.38 Kg of water will then be present for each Kg of dry solids in the combined papermill sludge and fly ash. The terms "molding" and "forming" are used broadly herein to refer to shaping of the product by any means and does not necessarily infer that a mold is used to shape the product. In the pan pelletizer, the pellets are formed by the accretion of moist material to form globs which gradually increase in size as the pan rotates. The resulting bodies pass out of the pelletizer as aggregates, i.e., pellets that are about 2.5 mm to about 2.6 cm in diameter and most preferably about 0.6 cm to about 1.3 cm in diameter. The size and shape of the pellets will depend upon the application to which they are to be placed. The pellets can be sized and outsized pellets pulverized for recycling if desired. In a modified form of the process, the plastic material is formed into larger bodies, i.e., panels, sheets, cylinders, blocks or pieces of any other desired shape using suitable roll forming or extruding equipment known in the art. The formed product will then comprise a panel, cylinder, block or pellet.

Drying

The finished pieces are dried or set up hard at ambient, i.e., room temperature, typically 10° C. to 32° C. and need not be oven dried. The pozzolanic reaction described herein-above begins to take place when water is added so as to reduce solubility and harden the product. The resulting product can be used as a construction material. It is dry, virtually rock-hard, does not have an obnoxious odor, is dust free, and can be considered environmentally stable in the sense that it does not degrade or leach harmful contaminants into the environment. In one preferred form of the invention up to about 10% by weight, e.g., 0.5% to 10% by weight, portland cement or plaster of paris is added during mixing in an amount effective to further increase the strength of the final product.

The invention will be better understood by reference to the following examples 1-6 which contain both ash and papermill waste.

EXAMPLE 1

|  | Parts by Weight | |
| --- | --- | --- |
|  | Preferred Range | Typical |
| Fly Ash[1] | 30–70 | 50 |
| Papermill Sludge[2] | 70–30 | 49.5 |
| Sodium Perborate | .1–2 | 0.5 |
|  | 100 | 100 |

[1] One fly ash sample obtained from burning Western coal had the following analysis: $SiO_2$, 45.3% $Al_2O_3$, 28.7%: CaO, 5.2%: $Fe_2O_3$, 2.93% $TiO_2$, 1.44% $K_2O$, 1.39% $P_2O_5$, 1.32% MgO, .80% $SO_3$, .80% $Na_2O$, .46% $Mn_3O_4$, .14% BaO, .11%
[2] Paper fiber, 2 parts; calcium carbonate, 1 part; clay, 1 part; water, 4 parts; potassium bisulfite, 2%

During agglomeration, about 5% by weight added water is sprayed on the product.

EXAMPLE 2

|  | Parts by Weight | |
| --- | --- | --- |
|  | Preferred Range | Typical |
| Fly Ash[1] | 30–70 | 59.5 |
| Papermill Sludge[2] | 70–30 | 40 |
| Sodium Perborate | .1–2 | 0.5 |

-continued

|  | Parts by Weight | |
|---|---|---|
|  | Preferred Range | Typical |
|  | 100 | 100 |

During agglomeration, about 8% by weight added water is introduced.

EXAMPLE 3

|  | Parts by Weight | |
|---|---|---|
|  | Preferred Range | Typical |
| Fly Ash[1] | 30–70 | 30 |
| Papermill Sludge[2] | 70–30 | 69 |
| Hydrogen Peroxide | .5–3 | 1 |
|  | 100 | 100 |

During agglomeration, 10% by weight water is added.

EXAMPLE 4

|  | Parts by Weight | |
|---|---|---|
|  | Preferred Range | Typical |
| Fly Ash[1] | 30–70 | 50 |
| Papermill Waste[3] | 70–30 | 49.5 |
| Cation Exchange Resin | .5–3 | 1 |
| Sodium Hypochlorite | .1–2 | 0.5 |
|  | 100 | 100 |

[3] 50% dry ingredients (paper fiber, 50%; clay, 50%) and 50% water

Just before molding, about 5% by weight of added water is introduced.

EXAMPLE 5

|  | Parts by Weight | |
|---|---|---|
|  | Preferred Range | Typical |
| Fly Ash[1] | 30–70 | 68.85 |
| Papermill Waste[3] | 70–30 | 39 |
| Cation Exchange Resin | .5–3 | 1 |
| Sodium Hypochlorite | .1–2 | 0.15 |
|  | 100 | 100 |

Just before molding, about 8 by weight of added water is introduced.

EXAMPLE 6

|  | Parts by Weight | |
|---|---|---|
|  | Preferred Range | Typical |
| Fly Ash[1] | 30–70 | 49.5 |
| Papermill Sludge[2] | 70–30 | 50 |
| Calcium Peroxide | .1–2 | 0.5 |
|  | 100 | 100 |

During agglomeration, about 5% by weight added water is introduced.

Further examples of formed ash products that contain no fiber:

EXAMPLE 7

|  | Parts by Weight | |
|---|---|---|
|  | Preferred Range | Typical |
| Fly Ash Scrubber Solids | 75–98 | 94 |
| Hydrogen Peroxide, 10% solution | 10–2 | 6 |
|  | 100 | 100 |
| Water |  | A/R* |

*As Required; i.e., an effective amount for rendering the composition plastic, i.e., formable or moldable.

EXAMPLE 8

|  | Parts by Weight | |
|---|---|---|
|  | Preferred Range | Typical |
| Bottom Ash | 74–98 | 91 |
| Calcium Hydroxide (lime) | 10–3 | 5 |
| Sodium Percarbonate | 8–2 | 4 |
|  | 100 | 100 |
| Water |  | A/R* |

EXAMPLE 9

|  | Parts by Weight | |
|---|---|---|
|  | Preferred Range | Typical |
| Fly Ash Scrubber Solids | 75–98 | 88 |
| Zeolite Clay | 12–1 | 8 |
| Hydrogen Peroxide | 8–1 | 4 |
|  | 100 | 100 |
| Water |  | A/R* |

EXAMPLE 10

|  | Parts by Weight | |
|---|---|---|
|  | Preferred Range | Typical |
| Bottom Ash | 70–92 | 86 |
| Zeolite Clay | 10–2 | 5 |
| Calcium Percarbonate | 10–2 | 5 |
| Calcium Hydroxide (lime) | 6–1 | 4 |
|  | 100 | 100 |
| Water |  | A/R* |

EXAMPLE 11

|  | Parts by Weight | |
|---|---|---|
|  | Preferred Range | Typical |
| Fly Ash Scrubber Solids | 75–98 | 89 |
| Portland Cement[4] | 10–1 | 4 |
| Zeolite Clay | 10–1 | 4 |
| Sodium Percarbonate | 8–5 | 3 |
|  | 100 | 100 |
| Water |  | A/R* |

[4] Present in an amount effective to harden the final product

EXAMPLE 12

|  | Parts by Weight | |
|---|---|---|
|  | Preferred Range | Typical |
| Bottom Ash | 72–95 | 87 |
| Portland Cement | 10–2 | 5 |
| Zeolite Clay | 10–2 | 5 |
| Calcium Hypochlorite | 6–1 | 3 |

-continued

|  | Parts by Weight | |
| --- | --- | --- |
|  | Preferred Range | Typical |
|  | 100 | 100 |
| Water |  | A/R* |

Examples 7–12 are formed into pellets by means of the pan pelletizer already described and set at room temperature (normally 20° C.) under ultraviolet light as described above.

EXAMPLE 13

|  | Parts by Weight | |
| --- | --- | --- |
|  | Preferred Range | Typical |
| Fly Ash Scrubber Solids | 75–98 | 88 |
| Zeolite Clay | 12–1 | 8 |
| Sodium Hypochlorite | 8–1 | 4 |
|  | 100 | 100 |
| Water |  | A/R* |

EXAMPLE 14

|  | Parts by Weight | |
| --- | --- | --- |
|  | Preferred Range | Typical |
| Fly Ash Scrubber Solids | 70–98 | 88 |
| Portland Cement | 12–1 | 8 |
| Calcium Peroxide | 8–1 | 4 |
|  | 100 | 100 |
| Water |  | A/R* |

EXAMPLE 15

|  | Parts by Weight | |
| --- | --- | --- |
|  | Preferred Range | Typical |
| Fly Ash Scrubber Solids | 70–98 | 89 |
| Plaster of Paris[5] | 10–1 | 4 |
| Zeolite Clay | 10–1 | 4 |
| Sodium Percarbonate | 8–5 | 3 |
|  | 100 | 100 |
| Water |  | A/R* |

[5]Present in an amount effective to harden the final product Fly Ash

Note: Bottom ash pellets formed with Zeolite clay are not solid unless the pH of the system is raised with portland cement or lime. The pH should be greater than 9 as the result of portland cement or lime that is added.

Commerical Application

When the product is formed into agglomerates or pellets, it can be used as an environmentally stable building material in the same manner that ordinary aggregate is used to serve as a lightweight constituent in concrete. In this application, it is used in the amount of about 40–60% by weight of the concrete, the balance being 20–30% sand and 15% portland cement. Water is added to provide the desired consistency. The resulting concrete can, of course, be used in any of its usual applications, e.g., in the construction of buildings, precast concrete structures, blocks, and other concrete products which will be apparent.

If the product is formed into slabs, panels, blocks or larger bodies, it can be employed in any suitable application for which such panels or slabs are adapted, for example, wallboard, exterior and interior sheeting, and tile underlayment.

Many variations of the present invention within the scope of the appended claims will be apparent to those skilled in the art once the principles described above are understood.

What is claimed is:

1. A method of producing environmentally stabilized formed bodies useful as an unfused building material from an ash produce selected from the group consisting of fly ash and bottom ash, said method comprising, admixing said fly ash or bottom ash with an oxidant to promote oxidation of at least a portion of the ash to form an admixture, providing or maintaining in said admixture an effective amount of water to render the admixture plastic, thereafter forming the plastic admixture into bodies, and allowing the formed bodies to harden to provide an environmentally stable product.

2. The method of claim 1 wherein the fly ash or bottom ash is an ash resulting from the burning of coal and said fly ash or bottom ash contains silica and alumina, lime, ferric oxide and titania.

3. The method of claim 1 wherein the oxidant comprises at least one member selected from the group consisting of sodium perborate, sodium percarbonate, sodium hypochlorite, calcium hypochlorite, calcium percarbonate, hydrogen peroxide, calcium peroxide, sodium peroxide, ethylene oxide and propylene oxide.

4. The method of claim 1 wherein the plastic admixture is exposed to electromagnetic radiation prior to hardening.

5. The method of claim 1 wherein the admixture contains heavy metal ions and a heavy metal sequestering agent selected from
 a) zeolite or
 b) an ion exchange resin is added to said admixture.

6. The method of claim 5 wherein the ion exchange resin comprises a cation exchange resin.

7. The method of claim 4 wherein the electromagnetic radiation is ultraviolet radiation.

8. The method of claim 1 wherein the hardening of said admixture is carried out at ambient temperature and without the use of an oven.

9. The method of claim 7 wherein the ultraviolet radiation is applied to the admixture after said oxidant is admixed therewith.

10. The method of claim 1 wherein the oxidation is effective to allow said formed bodies to undergo an irreversible pozzolanic hardening reaction in which solubility of the formed bodies is reduced and hardness of the formed bodies is enhanced.

11. The method of claim 1 wherein a member selected from portland cement and plaster of paris is contained in the admixture in an amount sufficient to increase the strength of the product.

12. The method of claim 1 wherein there is admixed with said ash at least one member selected from the group consisting of calcium hydroxide, zeolite clay, portland cement and plaster of paris.

13. The method of claim 3 wherein there is admixed with said ash a member selected from the group consisting of calcium hydroxide in the amount of from about 3% to about 10%, zeolite clay in the amount of from about 1% to about 12%, portland cement in the amount of from about 1% to about 10%, plaster of paris in the amount of from about 1% to 10%.

14. The method of claim 5 wherein the Zeolite is Zeolite clay.

15. The method of claim 5 wherein the heavy metal sequestering agent is an ion exchange resin and the oxidant raises the metal ions to their highest valence state for enhancing the action of the ion exchange resin.

16. A formed product useful as a building material comprising ash and an oxidant, said product being formed into a hard, unfused, environmentally stable body wherein at least about 85% of sulfur-containing ions present are converted by said oxidant to a sulfate.

17. The formed product of claim 16 wherein the said product comprises an unfused agglomerate comprising a) said ash, wherein said ash comprises stack gas scrubber solids and b) calcium carbonate and a salt of one of the following: calcium, potassium, sodium or magnesium.

18. The formed product of claim 16 wherein a cation exchange resin is present in said product.

19. The formed product of claim 16 wherein a member selected from portland cement and plaster of paris is contained in said product in an amount sufficient to increase the strength of the product.

20. The formed product of claim 16 wherein the building material is a panel.

21. The formed product of claim 16 wherein the building material is a cylinder.

22. The formed product of claim 16 wherein the building material is a block.

23. The formed product of claim 16 wherein the building material is a pellet.

* * * * *